J. E. Smith,
Buckle,
Nº 32,152.      Patented Apr. 23, 1861.

Witnesses:
Geo. H. Kelsey
R. Fitzgerald

Inventor:
John E. Smith

UNITED STATES PATENT OFFICE.

JOHN E. SMITH, OF WATERBURY, CONNECTICUT.

BUCKLE.

Specification of Letters Patent No. 32,152, dated April 23, 1861.

*To all whom it may concern:*

Be it known that I, JOHN E. SMITH, of the city of Waterbury, in the county of New Haven and State of Connecticut, have invented a new and useful Improvement in Clasps or Buckles, as a new article of manufacture; and I do hereby declare that the following is a full, clear, and exact description of the construction, character, and operation of the same, reference being had to the accompanying drawings, which make part of this specification, in which—

Figure 1:
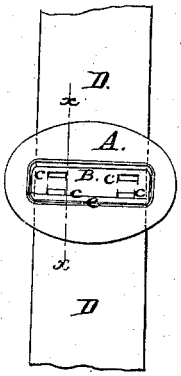
Figure 3:
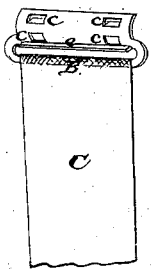
Figure 5:
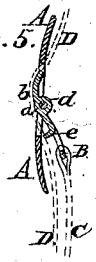
Figure 4:
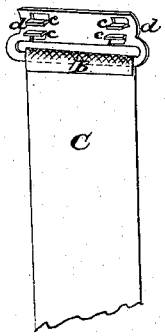
Figure 2:
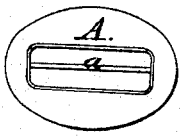

Figure 1, is a perspective view of the buckle, or clasp, complete, and ready for use. Fig. 2, is a perspective view of the front side of the main plate, which constitutes the bow, slide, and bar. Fig. 3, is a perspective view of the front, or outer, side of the inner, or loop, part, showing the loop, and the rib, or projecting edge, which binds the webbing. Fig. 4, is a perspective view of the back, or inner, side of the same, showing the projections, or leaves, which are to be clasped around the bar to secure it to the other, or main, part of the clasp. Fig. 5, is a section of Fig. 1, cut across at the dotted lines, $x$, $x$, showing the connection of the parts.

My improvement consists in making the clasp, or buckle, of two pieces of sheet metal, in such a manner that the webbing will be bound, or secured, at any desired point, by a rib, or projecting edge, immediately adjoining, and forming one side of, the loop, being pressed upon it so as to hold it firmly against the inner, or back, surface of the plate, by means of the strain on the loop occasioned by the standing part of the webbing. I make the main plate (which constitutes the bow, and slide) of one piece of sheet metal, substantially, as shown in Fig. 2, and at A, Fig. 1, by cutting it out with suitable dies; I then raise it, in suitable dies, to the shape desired, as to the shape indicated, in cross section, at A, A, Fig. 5, and, at the same operation of the dies, I sink down the bar, $a$, about the thickness of the metal, as represented in Fig. 2, to place the bar in a proper position to receive the other, or loop, part. I make the loop part of sheet metal, by cutting it from one piece, and raising it to its proper shape, as represented in Figs. 3 and 4, and indicated in section, at $b$, Fig. 5. I cut the holes, or spaces, shown at $c$, $c$, $c$, $c$, Figs. 1, 3, and 4, to furnish the projections, or leaves, shown at $d$ and $d$, Fig. 4, to be closed around the bar, $a$, Fig. 2, as represented at $d$, Fig. 5, to connect the two parts, and form a proper joint, or hinge, for the clasp, or buckle. A portion of what I cut out to form, or leave, the loop, B, Figs. 3, 4, and 5, I raise to the position shown at $e$, Figs. 3 and 5, to constitute the rib, or projecting edge, which is to bind, or secure, the webbing, at the desired point, by pressing it against the back, or inner, side of the slide part of the main plate, A, as indicated by a red line, at $e$, Fig. 5. I pass the projections, or leaves, $d$ and $d$, Fig. 4, of the loop part, onto the bar, $a$, Fig. 2, and set them to their places with proper dies, so as to form the proper joint, or hinge, as indicated, in section, at $d$, Fig. 5, when the clasp, or buckle, will be ready for use, as shown in Fig. 1 and indicated, in section, in Fig. 5. I attach the standing part, C, of the webbing to the loop, B, as shown in Figs. 3 and 4, and pass the running part, D, D, under both parts of the main plate, A, (which serves as both bow, and slide,) and over the other, or loop, part, as shown in Figs. 1, and 5, when the strain on the standing part, will press the rib, or projecting edge, $e$, Figs. 3 and 5, upon the web and hold it firmly against the main plate, A, as indicated, in section, in Fig. 5, when the whole will appear as represented in Fig. 1.

I can make the clasp, or buckle, of any kind of sheet metal, and of any desired size, and form, and I can finish it in any desired style, from the cheapest, and plainest, to the richest, and most ornamental, and they may be used for the most costly ribbons, or richest metallic, or embroidered, lace, as these clasps will not mar either of them in the least (as others do) by either perforations or abrupt bends; and as the webbing is confined by the direct pressure of the rib, or projecting edge, $e$, there will be no slipping, or rendering, to mar, or soil, the surface of the webbing.

I am aware that clasps, and buckles, have long been made of two pieces of sheet metal, and that clasps have been made to confine the webbing by one part passing within the other; but in such cases the webbing must always be, substantially, of the same thickness, and it must also receive an abrupt bend; and that a buckle, or clasp, was patented by Wm. Scarlett, May 14, 1850, but in this the end of the lever (which secures the webbing) will allow the webbing to render, or draw back, some little distance, when it is pressed nearly to its extreme tightness, which will always tend to soil the right, or outer, side of the webbing, and is, therefore, not fit to be used for rich ribbons, or embroidered, or metallic, webbing, or lace. I, therefore, do not claim either of these, as such, as my invention; but

What I claim as my invention, and desire to secure by Letters Patent, is—

A buckle or clasp consisting of the loop part, (Figs. 3 and 4,) with its rib, or projecting edge, (*e*,) in combination with the main plate, (A,) when the parts are constructed, connected, and fitted to produce the result, substantially, as herein described.

JOHN E. SMITH.

Witnesses:
GEO. R. KELSEY,
R. FITZGERALD.